(12) United States Patent
Davis

(10) Patent No.: US 10,470,095 B2
(45) Date of Patent: Nov. 5, 2019

(54) METHOD FOR AIR-TO-GROUND DATA LINK ANTENNA SELF CALIBRATION

(71) Applicant: QUALCOMM Incorporated, San Diego, CA (US)

(72) Inventor: Roy Howard Davis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1228 days.

(21) Appl. No.: 13/740,248

(22) Filed: Jan. 13, 2013

(65) Prior Publication Data
US 2016/0212669 A1    Jul. 21, 2016

(51) Int. Cl.
*H04W 36/18* (2009.01)
*H01Q 3/26* (2006.01)
(Continued)

(52) U.S. Cl.
CPC .......... *H04W 36/18* (2013.01); *H01Q 3/2605* (2013.01); *H04B 7/0617* (2013.01); *H04B 7/18506* (2013.01)

(58) Field of Classification Search
CPC .. H04B 7/0615; H04B 7/0626; H04B 7/0632; H04B 7/18506; H04L 2025/03681; H04W 36/18
See application file for complete search history.

(56) References Cited

U.S. PATENT DOCUMENTS

| 5,027,124 A |   | 6/1991 | Fitzsimmons et al. |
| 5,557,282 A | * | 9/1996 | Mertens ................ H01Q 19/17 342/123 |

(Continued)

FOREIGN PATENT DOCUMENTS

| CN | 1373944 A | 10/2002 |
| CN | 1522506 A | 8/2004 |

(Continued)

OTHER PUBLICATIONS

Pencil beam antenna. (1999). Focal Dictionary of Telecommunications, Focal Press. London, UK: Routledge. Retrieved from https://search.credoreference.com/content/entry/bhfidt/pencil_beam_antenna/0 (Year: 1999).*

(Continued)

*Primary Examiner* — Bernarr E Gregory
*Assistant Examiner* — Fred H Mull
(74) *Attorney, Agent, or Firm* — Seyfarth Shaw LLP

(57) ABSTRACT

A beam pattern of a base station antenna is refined when communicating with multiple aircraft, so that interference to adjacent beams from the base station are reduced. The method include receiving position locations from each of multiple aircraft. The method also include the receipt of an attitude of each of the aircraft as well as receipt of measurements of the pilot signals from each of the aircraft. The pilot signals were transmitted by the base station. The method also include the adjustment of an amplitude and a phase of a signal driving at least one antenna transmit element to refine the beam pattern. The adjustment is based at least in part on the pilot measurements, the position locations, and the attitude of each of the aircraft.

30 Claims, 10 Drawing Sheets

(51) Int. Cl.
*H04B 7/185* (2006.01)
*H04B 7/06* (2006.01)

(56) References Cited

U.S. PATENT DOCUMENTS

| | | | |
|---|---|---|---|
| 5,781,845 A * | 7/1998 | Dybdal | H04B 7/0615 |
| | | | 342/380 |
| 6,018,659 A | 1/2000 | Ayyagari et al. | |
| 6,100,843 A | 8/2000 | Proctor, Jr. et al. | |
| 7,113,779 B1 | 9/2006 | Fujisaki | |
| 8,145,208 B2 | 3/2012 | Chari et al. | |
| 2003/0185293 A1 * | 10/2003 | Rademacher | ............................. |
| | | | H04L 2025/03681 |
| | | | 375/232 |
| 2003/0197637 A1 * | 10/2003 | Lalezari | H01Q 3/2611 |
| | | | 342/354 |
| 2005/0014533 A1 * | 1/2005 | Cave | H04B 7/0617 |
| | | | 455/562.1 |
| 2005/0129137 A1 * | 6/2005 | Yamada | H04B 7/0417 |
| | | | 375/267 |
| 2006/0229076 A1 | 10/2006 | Monk | |
| 2009/0100476 A1 * | 4/2009 | Frisco | H04B 7/18508 |
| | | | 725/68 |
| 2010/0123625 A1 * | 5/2010 | Martin | H01Q 1/246 |
| | | | 342/377 |
| 2010/0130227 A1 * | 5/2010 | Farthofer | H04W 8/10 |
| | | | 455/456.1 |
| 2010/0232538 A1 * | 9/2010 | Watanabe | H04B 7/0632 |
| | | | 375/267 |
| 2011/0032149 A1 * | 2/2011 | Leabman | H01Q 1/246 |
| | | | 342/368 |
| 2011/0103504 A1 | 5/2011 | Ma | |
| 2012/0092217 A1 * | 4/2012 | Hosoya | H01Q 3/267 |
| | | | 342/373 |
| 2012/0119953 A1 * | 5/2012 | Hosoya | G01S 3/74 |
| | | | 342/373 |
| 2012/0200458 A1 * | 8/2012 | Jalali | H01Q 1/2291 |
| | | | 342/372 |

FOREIGN PATENT DOCUMENTS

| | | |
|---|---|---|
| CN | 101536360 A | 9/2009 |
| CN | 101536566 A | 9/2009 |
| CN | 102217409 A | 10/2011 |
| JP | 2009081696 A | 4/2009 |
| JP | 2013501480 A | 1/2013 |
| WO | 0217675 A2 | 2/2002 |
| WO | 03003614 A1 | 1/2003 |
| WO | 2011017573 A2 | 2/2011 |

OTHER PUBLICATIONS

International Search Report and Written Opinion—PCT/US2014/011121—ISA/EPO—dated May 9, 2014.

* cited by examiner

METHOD FOR AIR-TO-GROUND DATA LINK ANTENNA SELF CALIBRATION

BACKGROUND

Field

Aspects of the present disclosure relate to air-to-ground communication systems, and more particularly to an air-to-ground communications system adapted for use with an airborne mobile platform that accomplishes soft hand offs between terrestrial base transceiver stations in a cellular network while the mobile platform is in flight.

Background

Wireless communication networks are widely deployed to provide various communication services such as telephony, video, data, messaging, broadcasts, and so on. Such networks, which are usually multiple access networks, support communications for multiple users by sharing the available network resources. Typically, such networks are terrestrial-based networks, however, in recent years, publicly accessible networks are being made available for passengers on commercial air transportation, e.g., airplanes and other aircraft.

Such services are typically known as air-to-ground (ATG) communication services, and may provide such services as broadband data, voice communication, and entertainment such as streaming movies or music. Although ATG services and networks are similar to currently deployed terrestrial cellular and other wireless networks, there are aspects of ATG networks that differ from these networks.

Typically, as aircraft fly across a geographic region, each aircraft is serviced by a particular base transceiver station (BTS) until signal quality, signal strength, or available bandwidth from that BTS is insufficient, at which time service is transferred to another BTS. Such a transfer is typically called a "handoff," similar to handoffs that occur in terrestrial cellular networks for cellular devices (handsets, PDAs, etc.) when such devices are mobile.

Aircraft typically use a single transceiver having an antenna mounted on the undercarriage of the aircraft to communicate with the BTS. However, BTS antenna patterns are usually designed to service terrestrial customers, and the beam patterns at a given BTS are usually not arranged to service ATG communications traffic.

Further, merely replicating the terrestrial cellular beam patterns around the aircraft in an omnidirectional pattern would provide insufficient signal strength and capacity to service the thousands of aircraft and potentially hundreds of thousands of users in such an ATG system.

Further, typical cellular and mobile devices use antenna patterns that transmit power in all directions, and if such antennas had high enough gain patterns to communicate directly with a terrestrial BTS, such transmissions would cause interference into all BTS sites within a line of sight of transmission of the cellular device. The line-of-sight transmission for a device increases when the transmitter/antenna pattern is at altitude, thus further complicating the interference problem. Increased interference also reduces data bandwidth, which creates lower data throughput in an ATG system that can use cellular telephones and other mobile devices directly.

As such, the antennas used in ATG systems are typically "directional" antennas, where the antenna on the aircraft directs the outgoing transmission in certain directions, and the BTS antenna also directs the transmission power in the direction of aircraft in the BTS service area. The aircraft antenna receives the omnidirectional transmissions from the cellular telephones on board, and the aircraft antenna directs these transmissions toward a specific BTS antenna, which reduces interference and increases data throughput.

Once the aircraft begins leaving a particular BTS service area, the aircraft service is handed off to another BTS in order to maintain communication with the devices on board that aircraft. Such a handoff should occur before communication is lost with the serving BTS to ensure continuous communication channels for the devices on board. Such communication channels are difficult to maintain without interaction between the aircraft antenna and the BTS antennas, because signal strengths and signal quality are typically not known.

SUMMARY

The present disclosure describes methods, apparatuses, and computer program products for refining beam patterns of antennas.

In one aspect of the present disclosure, a method of refining a beam pattern of a base station antenna configured to communicate with multiple aircraft in which interference to adjacent beams from the base station is reduced is described. The method receives reports of measurements of pilot signals from each of the aircraft, the received measurements of pilot signals having been transmitted by the base station. The method further includes adjusting an amplitude and a phase of a signal driving at least one antenna transmit element to refine the beam pattern. The adjustment is based at least in part on the received reports of measurements of pilot signals from each of the aircraft.

In another aspect of the present disclosure, a method refines a beam pattern of an antenna beam of a base station antenna configured to communicate with multiple aircraft with beams to reduce interference to adjacent beams from the base station. The method receives position locations from each of the aircraft and receives an attitude of each of the aircraft. The method measures pilot signals transmitted from each of the aircraft, and adjusts an amplitude and a phase of a signal driving at least one antenna receive element to refine the beam pattern. The adjustment is based at least in part on the received measurements of pilot signals, the received position locations, and/or the attitude of each of the aircraft.

An apparatus in accordance with another aspect of the present disclosure refines a beam pattern of a base station antenna configured to communicate with multiple aircraft with multiple beams. The apparatus includes means for receiving position locations from each of the aircraft and means for receiving an attitude of each of the aircraft. The apparatus further has means for receiving measurements of pilot signals from each of the aircraft, where the received measurements of pilot signals were transmitted by a base station. The apparatus also has means for adjusting an amplitude and a phase of a signal driving at least one antenna transmit element to refine the beam pattern. The adjustment is based at least in part on the received measurements of the pilot signals, the received position locations, and/or the attitude of each of the aircraft.

In still another aspect of the present disclosure, an apparatus refines a beam pattern of a base station antenna communicating with multiple aircraft with multiple beams. The apparatus has a transmitter configured to transmit pilot signals to each of the aircraft, and a receiver configured to receive position locations from each of the aircraft, as well as an attitude of each of the aircraft and measurements of pilot signals from each of the aircraft. The apparatus also has a controller, coupled to the transmitter and receiver, configured to adjust an amplitude and a phase of a signal driving at least one antenna transmit element to refine the beam pattern. The adjustment is based at least in part on the pilot measurements. The adjustment may be further based on position locations, and/or attitude of each of the aircraft.

In another aspect of the present disclosure, a computer program product is configured for refining a beam pattern of a base station antenna configured to communicate with multiple aircraft with multiple beams. The computer program product includes a non-transitory computer-readable medium having non-transitory program code recorded thereon. The non-transitory program code has program code to transmit pilot signals to aircraft, program code to receive position locations from each of the aircraft, and an attitude of each of the aircraft and measurements of the transmitted pilot signals from each of the aircraft. The non-transitory program code also has program code to adjust an amplitude and a phase of a signal driving at least one antenna transmit element to refine a beam pattern. The adjustment is based at least in part on the received measurements of pilot signals, the position locations, and/or the attitude of each of the plurality of aircraft.

In another aspect of the present disclosure, a method refines a beam pattern of receiving communication signals containing pilot signals at a first aircraft from the base station. The pilot signals are measured at the first aircraft, and the pilot measurement reports are transmitted from the first aircraft to the base station. Further communication signals with reduced interference are received at an aircraft, resulting from the base station adjusting an amplitude and a phase of a signal driving at least one antenna transmit element. The adjustment is based at least in part on the reports of measurements of pilot signals transmitted from the first aircraft.

An apparatus for refining a beam pattern of a base station antenna configured to communicate between a base station and multiple aircraft using multiple beams has an aircraft receiver configured to receive communication signals containing pilot signals from a base station transmitter at a first aircraft. The apparatus also has a processor, coupled to the receiver, configured to measure the pilot signals at the first aircraft, and an aircraft transmitter, coupled to the processor, configured to transmit the pilot signal measurement reports from the first aircraft to the base station. The apparatus further includes a controller, coupled to the base station transmitter, for adjusting an amplitude and a phase of a signal driving at least one antenna transmit element in the base station transmitter to refine the beam pattern. The adjustment is based at least in part on the reports of the pilot signal measurement reports transmitted from the first aircraft.

An apparatus for refining a beam pattern of a base station antenna configured to communicate between a base station and multiple aircraft using multiple beams includes means for receiving configured to receive communication signals containing pilot signals from a base station transmitter at a first aircraft. The apparatus also has means, coupled to the receiving means, for measuring the pilot signals at the first aircraft. The apparatus also includes means, coupled to the processing means, for transmitting the pilot signal measurement reports from the first aircraft to the base station and means, coupled to the base station transmitter, for adjusting an amplitude and a phase of a signal driving at least one antenna transmit element in the base station transmitter to refine the beam pattern. The adjustment is based at least in part on the reports of the pilot signal measurement reports transmitted from the first aircraft.

A computer program product configured for refining a beam pattern of a base station antenna configured to communicate with multiple aircraft with multiple beams in accordance with another aspect of the present disclosure includes a non-transitory computer-readable medium having non-transitory program code recorded thereon. The non-transitory program code has program code to receive communication signals containing pilot signals at a first aircraft from the base station, program code to measure the pilot signals at the first aircraft, program code to transmit the pilot measurement reports from the first aircraft to the base station, and program code to adjust an amplitude and a phase of a signal driving at least one antenna transmit element to refine the beam pattern. The adjustment is based at least in part on the reports of measurements of pilot signals transmitted from the first aircraft.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Air-to-Ground Communications

Figure 1:
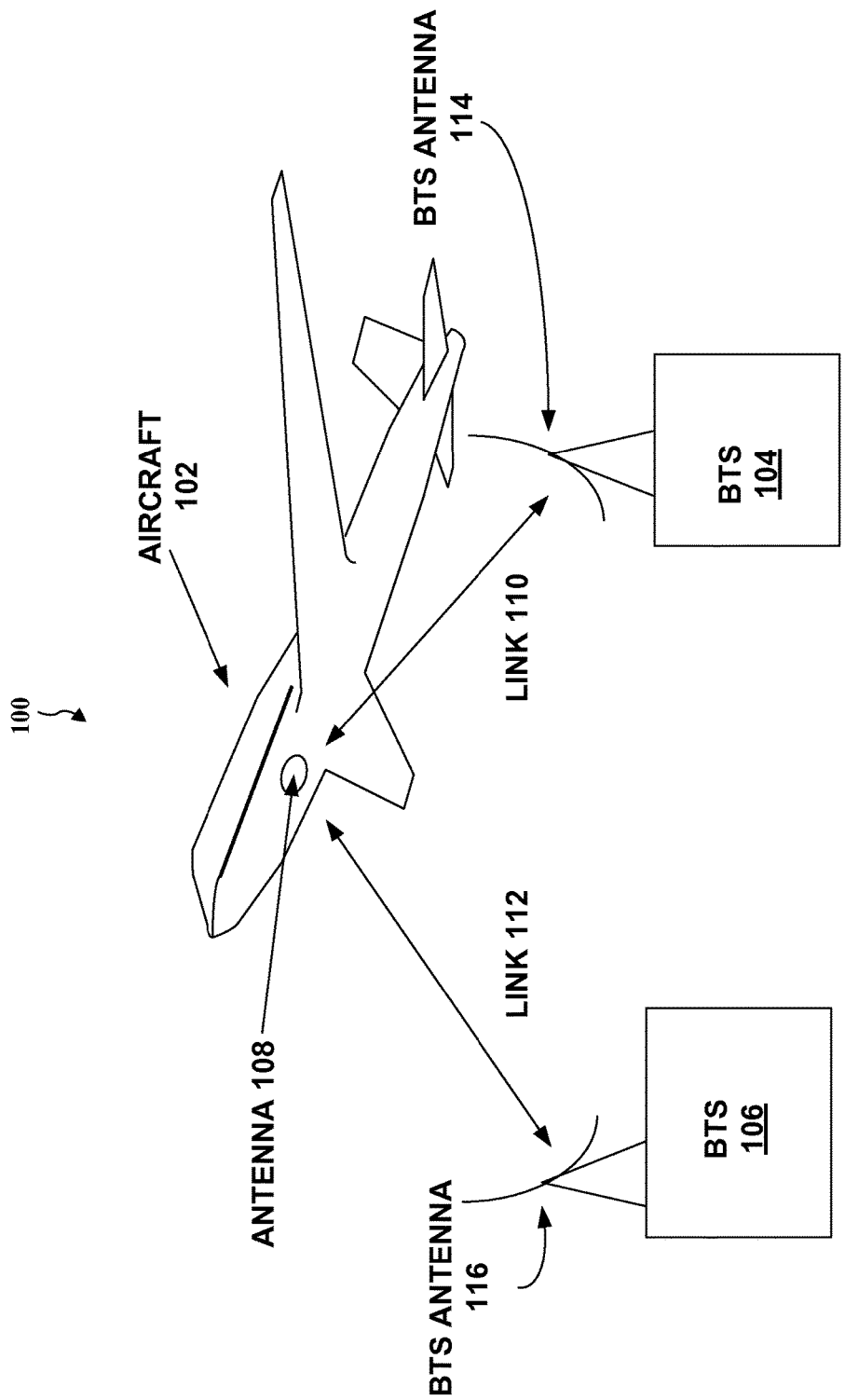
FIG. 1 illustrates a diagram of an example of an air-to-ground telecommunications system.

FIG. 1 illustrates a diagram of an example of an air-to-ground telecommunications system.

A system 100, as shown, includes an aircraft 102 and multiple base transmission stations (BTS) 104-106. Although only the aircraft 102, the BTS 104 and the BTS 106 are shown for clarity, any number of aircraft and BTSs can be implemented within the scope of the present disclosure.

The aircraft 102 has an antenna 108 that is used for communication with one or more of the BTS 104 and the BTS 106 via a communication link 110 and/or a communication link 112 via a BTS antenna 114 and/or a BTS antenna 116.

As the aircraft 102 flies overhead via a predefined route at regulated altitudes, the aircraft 102 will enter and leave the service area for BTS 104 and/or BTS 106, as well as any other BTSs that are in a geographically proximate area. Typically, terrestrial cellular systems adapted for ATG service use a wide beam width (e.g., the BTS antenna 114 and/or the BTS antenna 116) to service the aircraft 102 via the antenna 108. The wide beam width in used in an attempt to provide voice and low-speed data services to cellular telephones or other mobile devices (not shown) that are on board of the aircraft 102. Such an approach, however, typically does not have sufficient bandwidth or power to properly maintain the communication link 110 or the communication link 112 to service the aircraft 102 or other aircraft that are in the geographic service area for the BTS 104 and/or the BTS 106.

Aspects of the present disclosure provide support for the communication link 110 and the communication link 112 by higher frequencies to increase the bandwidth provided to the aircraft 102 from the BTS 104 and/or the BTS 106. The higher frequencies enable a higher data rate service to the aircraft 102, as well as other aircraft in the geographic service areas of the BTS 104 and/or the BTS 106.

Figure 2:
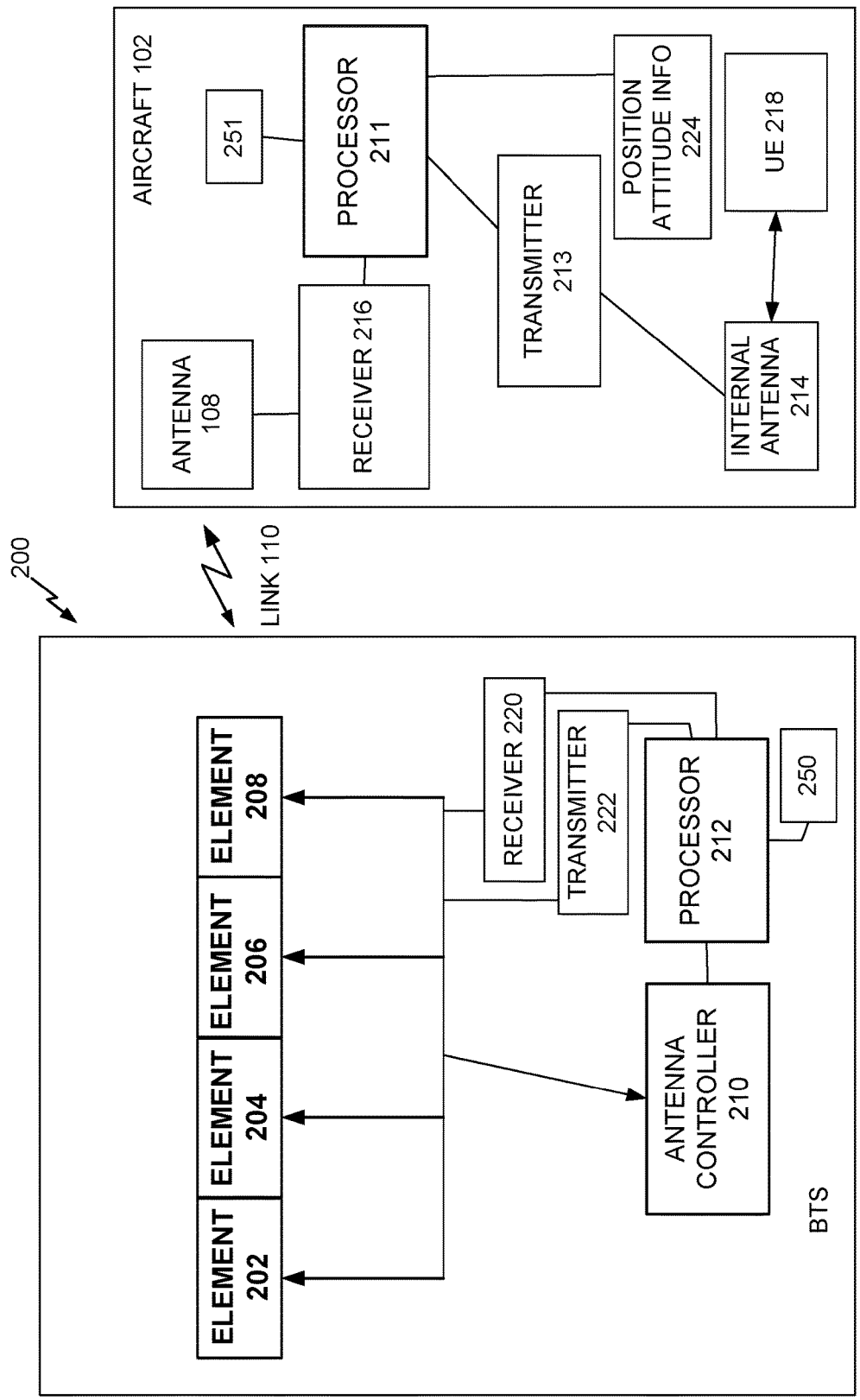
FIG. 2 illustrates a base transmitting station antenna in accordance with one or more aspects of the present disclosure.

FIG. 2 illustrates a base station transmitting antenna in accordance with one or more aspects of the present disclosure.

An antenna 200 (illustrated as the BTS antenna 114 and/or the BTS antenna 116 in FIG. 1) can be a steerable beam antenna, implemented as a phased array antenna having multiple antenna elements 202-208. Other steerable beam antennas, such as tracking antennas, are envisioned as within the scope of the present disclosure.

The system 100 of the present disclosure may use microwave spectrum currently used by very small aperture terminal (VSAT) uplinks, which is typically in the Ku-band of frequencies at approximately 12-14 GHz, although can also be in other frequency ranges and bands without departing from the scope of the present disclosure. To enable this spectrum reuse without degrading other uses of VSAT frequencies in other systems, e.g., maritime VSAT, other previously-deployed VSAT systems, etc., aspects of the present disclosure control the antenna patterns of the BTS antenna 114 and the BTS antenna 116, as well as the antenna pattern of the antenna 108, to reduce interference between the system 100 and VSAT systems.

To further enable the system 100, the BTS antenna 114 and/or the BTS antenna 116 use very narrow transmission beams, sometimes called "pencil" beams. Pencil beams may have main power lobes of the beam pattern that are on the order of 1 degree by 2 degrees for supporting spatial multiplexing gain where the VSAT spectrum is reused for multiple aircraft from each BTS 104-106. This spatial multiplexing utilizes these very well defined beams by reducing interference, also referred to as "bleed over," from one beam to any other beam within the system 100. The BTS uses these beams to transmit communication signals to aircraft and to receive communication signals from aircraft.

To track multiple aircraft (e.g., aircraft 102) as they move across the field of view of the BTS antenna 114-116, each of the aircraft 102 is illuminated with a narrow pencil beam formed by the antenna elements 202-208. These beams are used to establish the communication link 110 (or the communication link 112), and these links are maintained by an antenna controller 210. In this configuration, the antenna controller 210 controls the phase and amplitude coefficients of signals that drive each of the antenna elements 202-208 to form and manipulate the beams used for the communication link 110. The processor 212 is coupled to antenna controller 210, the transmitter 222, and the receiver 220 at the BTS 104-106. The processor 212 may direct the formation of many beams over the communication link 110 depending on the amplitude and phase coefficients for a given signal to be transmitted or a given signal being received at the BTS 104 and/or the BTS 106. The signals contained in those beams include reference signals, which are known by both the transmitter and the receiver. The reference signals are intended to enable measurement of the signal. These reference signals are also known as pilots or pilot signals.

The aircraft 102 operates similarly, in that the communication link signals are sensed at the antenna 108 and received at the aircraft receiver 216. These signals are processed by a processor 211, which may be a similar or different processor than the processor 212 at the BTS 104 and/or the BTS 106, and then transmitted in the aircraft 102 by the transmitter 213. The processor 211 may execute software stored on a computer-readable medium 251. The internal antenna 214 transmits these signals to a user equipment 218 (UE), such as cellular telephones and PDA devices, which then transmit back to the internal antenna 214. These signals are then received by the transmitter 213 and processed by the processor 211, and then retransmitted by the transmitter 213 through the antenna 108 back to the BTS 104 and/or the BTS 106.

In essence, the antenna 200 creates pencil beams through the use of the antenna 200 (e.g., a phased array) made up of multiple antenna elements 202-208 that are energized in particular phase and amplitude configurations to follow the aircraft 102 as it moves. Mechanical stress, thermal and local scattering effects affect the communication link 110 and the communication link 112. These effects also distort the beam pattern of the antenna 200 which reduces the performance of the system 100 by increasing the power in the side lobes of the antenna beam created by the antenna 200. Because the beam from the antenna 200 is only fully formed and measurable at a considerable distance from the antenna 200, typically several meters from the antenna 200 itself because of the high gain of the antenna 200 beam, sampling the beam close to the antenna (e.g., in the near field) is problematic.

Further, atmospheric conditions between the BTS 104-106 and the antenna 108 of the aircraft 102 may affect the beam, causing it to distort or diverge from the determined path, which affects the performance of the communication link 110. The distortion or divergence effects may include beam squint, beam size distortion, or other effects, any of which reduces the bandwidth available for data/voice transmission between the BTS 104-106 and the antenna 108. The antenna 200 can compensate for these effects by adjusting the phase and amplitude of the drive to each of the antenna elements 202-208, but only when there is some ability to determine the shape of the beam formed by antenna 200 at an appropriate distance from the antenna.

In one configuration, an apparatus of the present disclosure includes a means for receiving position locations from each of the plurality of aircraft. The apparatus further includes a means for receiving an attitude of each of the plurality of aircraft, and a means for receiving measurements of pilot signals from each of the plurality of aircraft. The apparatus also includes a means for adjusting an amplitude and a phase of a signal driving at least one antenna transmit element to refine the beam pattern. In one aspect, the means for receiving an attitude of each of the plurality of aircraft and the means for receiving measurements may be the receiver 220, configured to perform the functions recited by each of the receiving means. The means for adjusting may be the antenna controller 210, configured to perform the functions of the adjusting means. In another aspect, the aforementioned means may be a device or other apparatus configured to perform the functions recited by the aforementioned means.

In another configuration, an apparatus of the present disclosure includes means for receiving communication signals containing pilot signals from a base station transmitter. The apparatus further includes means for measuring the pilot signals at the first aircraft, and means for transmitting pilot signal measurement reports to the base station. The apparatus further includes means for adjusting an amplitude and a phase of a signal driving at least one antenna transmit element in the base station transmitter. In one aspect, the means for receiving communications signals may be the receiver 216, configured to perform the functions recited by the receiving means. The means for measuring may be the processor 211, configured to perform the functions of the measuring means. The means for transmitting may be the transmitter 213, configured to perform the functions of the transmitting means. The means for adjusting may be the antenna controller 210, configured to perform the functions of the adjusting means. In another aspect, the aforementioned means may be a device or other apparatus configured to perform the functions recited by the aforementioned means.

Effects of Adjustment of Antenna Coefficients

Figure 3:
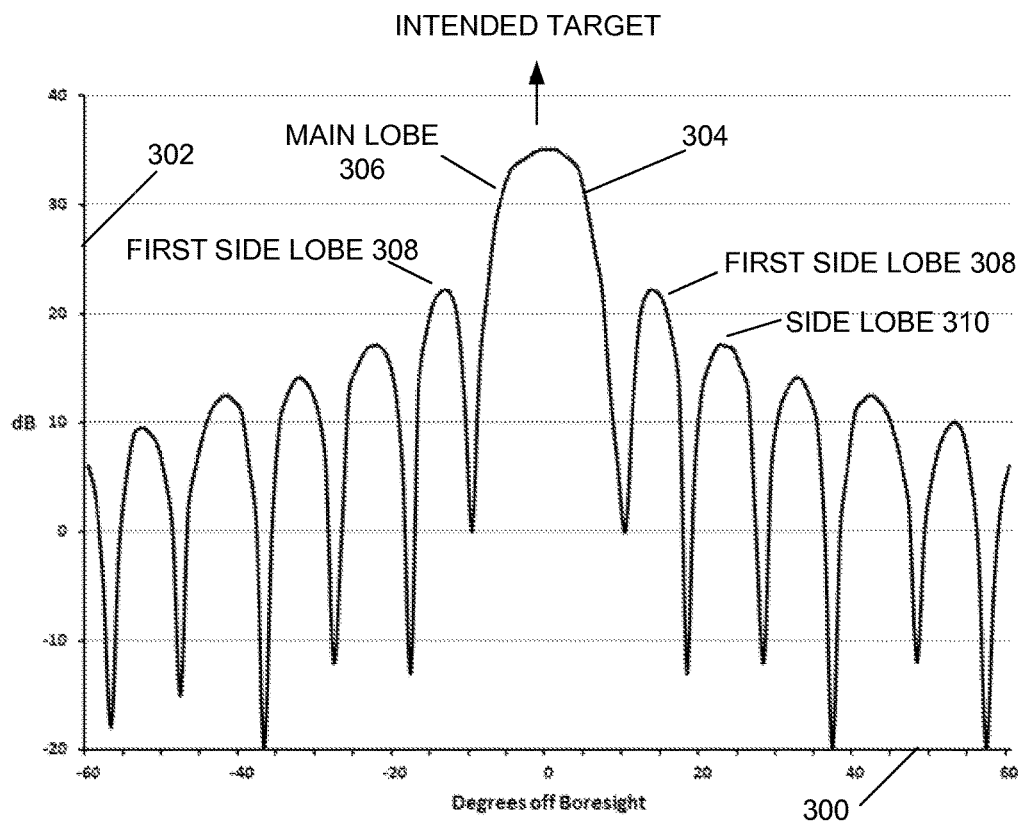
FIG. 3 illustrates an azimuth antenna pattern that may be deployed in an air-to-ground broadband communications system in accordance with aspects of the present disclosure.

FIG. 3 illustrates an azimuth antenna pattern that may be deployed in an air-to-ground broadband communications system in accordance with aspects of the present disclosure.

In a communications system that uses a phased array antenna to provide antenna gain, the precise adjustment of the amplitude and phase coefficients is not critical if the system only employs one beam. When the communications system uses the multiple beams possible with a phased array antenna, and the beams provide spatial multiplexing to multiple users of the system, the adjustment of the coefficients becomes more important. This precise adjustment of coefficients is known as calibration of the phased array.

In FIG. 3, the horizontal axis 300 indicates the angle in the horizontal plane, and the vertical axis 302 indicates the signal amplitude 304 in that direction. The intended target (e.g., aircraft 102 or, alternatively, the BTS 104 and/or the BTS 106) is in the center of the chart with the angle of 0 degrees, which is also referred to as the antenna bore sight.

In FIG. 3, the phased array coefficients for the antenna are calibrated to the proper values. For this example, the signal amplitude peak gain is 35 dB at bore sight. In other words, when the center of the plane of the antenna 200 is pointed at the intended target, the antenna provides 35 dB of gain to the signal entering the antenna 200.

The first side lobes 308 of the antenna 200 appear at approximately plus and minus 15 degrees away from the main beam and have a gain of 22 dB. This means the signal transmitted from this antenna will be 13 dB weaker at the angle of the first side lobes 308 than at the angle of the bore sight. That is, areas that are ten degrees away from the intended target (e.g., other aircraft and/or other BTS) receive a signal that is 13 dB lower in power than the intended target receives if the antenna 200 is pointed correctly. Additional side lobes 310 are spaced at intervals of angles farther off the bore sight.

Figure 4:
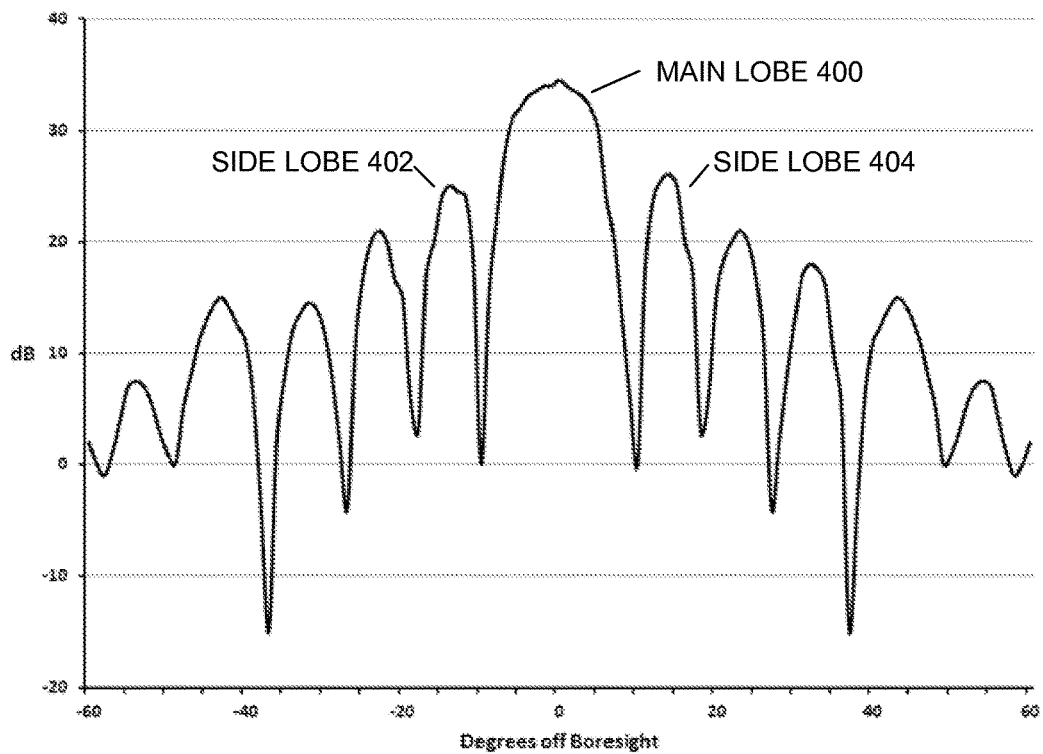
FIG. 4 illustrates an azimuth antenna pattern that may be deployed in an air-to-ground broadband communications system in accordance with one or more aspects of the present disclosure.

FIG. 4 illustrates an azimuth antenna pattern that may be deployed in an air-to-ground broadband communications system.

FIG. 4 illustrates the antenna 200 configured as a phased array with random errors of plus and minus 10 degrees in phase and plus and minus 15 percent in amplitude. At the frequency of interest these are fairly small errors that cannot be minimized without frequent adjustment as the temperature varies and mechanical stresses on the antenna structure change, such as from strong winds.

With the random errors introduced into the coefficients, the main lobe 400 has only very minor degradation with respect to the main lobe 306 of FIG. 3, with the peak gain of the main lobe 400 dropping about 1 dB. The side lobes 402 and 404, however, have increased dramatically from 13 dB below the peak gain to only 9 dB below. This shows that the power being transmitted to locations other than the intended target has increased by over 50%, which decreases the power used for data transmission and increases the power that bleeds over creating interference with other beams and other targets.

Figure 5:
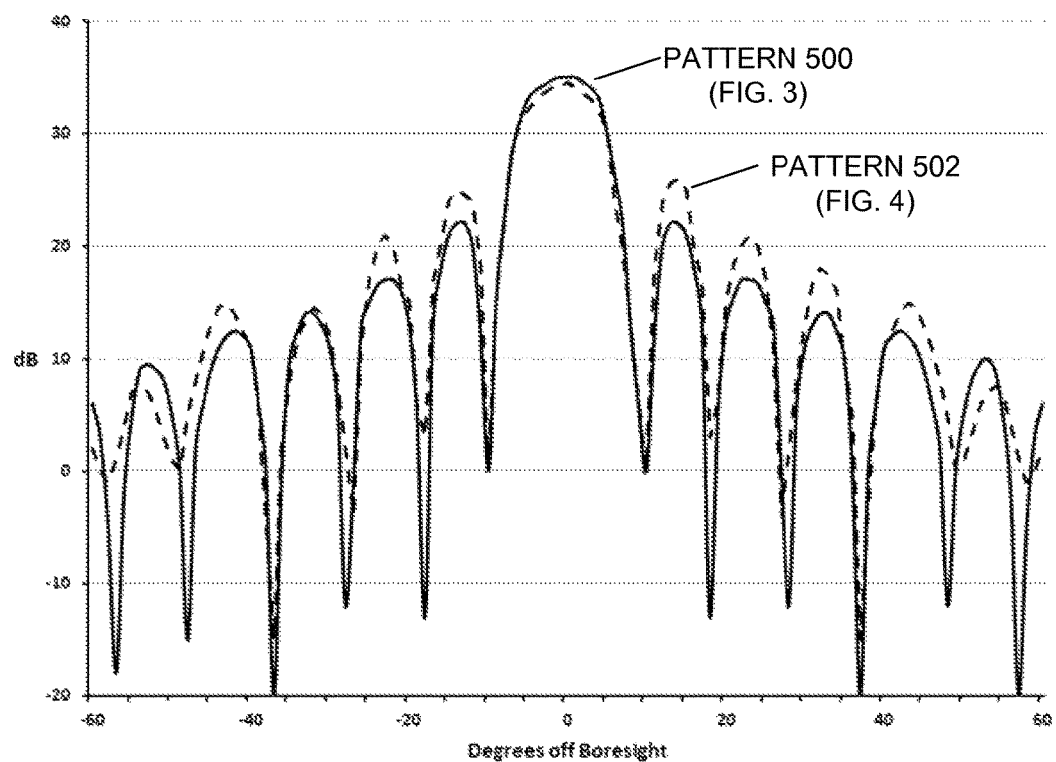
FIG. 5 illustrates a comparison between the antenna patterns of FIGS. 3 and 4.

FIG. 5 illustrates a comparison between the antenna patterns of FIGS. 3 and 4. A pattern 500 (solid line) is shown from FIG. 3, and pattern 502 (dashed line) is shown from FIG. 4.

Figure 6:
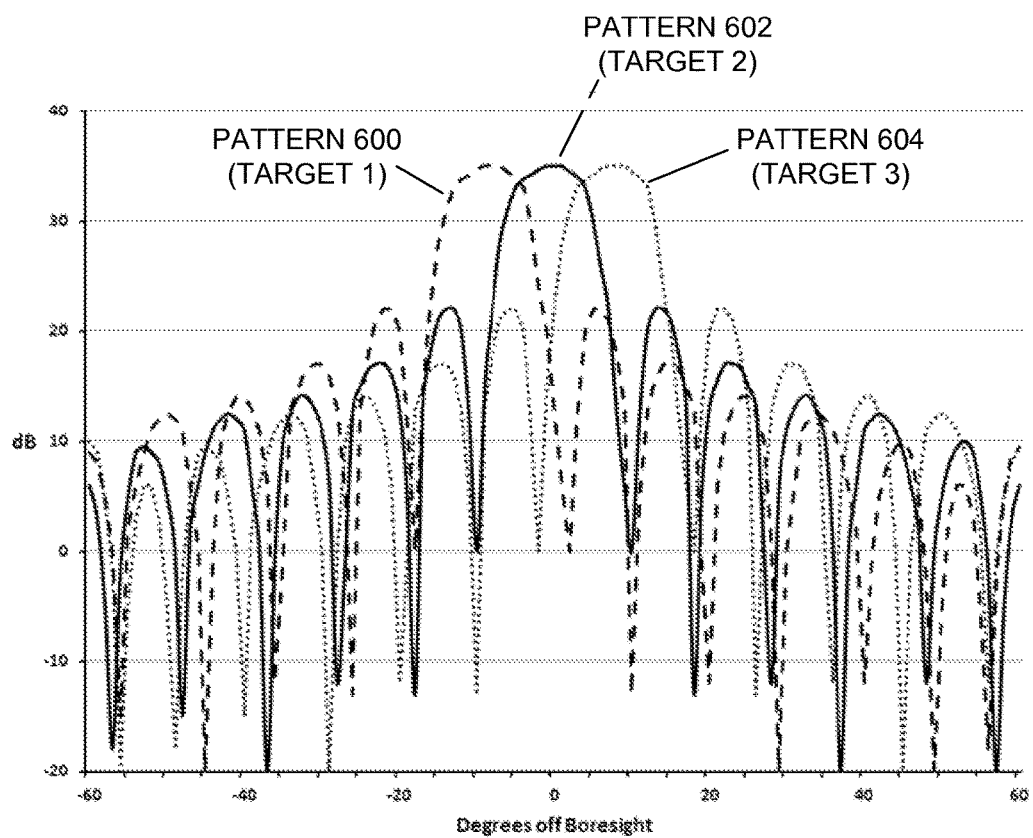
FIG. 6 illustrates example antenna patterns where multiple antennas are simultaneously communicating with an antenna.

FIG. 6 illustrates example antenna patterns where multiple antennas are simultaneously communicating with an antenna.

In FIG. 6, the beam patterns 600-604 illustrate the antenna patterns of three closely spaced targets (e.g., the aircraft 102) that can be simultaneously communicating with the BTS 104 and/or the BTS 106. The beam patterns 600-604 indicate that three separate beams are used to provide spatial multiplexing, such that the main lobes of each of the beam patterns 600-604 are pointed in different directions, allowing each target (e.g., the aircraft 102) to discriminate between the patterns. Such spatial discrimination allows for frequency channel reuse from a given one of the BTS 104 and/or the BTS 106. Although three beam patterns 600-604 are shown, a larger or smaller number of the beam patterns 600-604 can be used within the scope and spirit of the present disclosure.

The side lobes of each of the beam patterns 600-604 allow signal to spill over into the adjacent beams. As interference between the side lobes and main lobe for each of the beam patterns 600-604 increases, the difference in power between the side lobes and the main lobe of each of the beam patterns 600-604 becomes more important.

In FIG. 6, there is a 13 dB difference between the main lobe peak power and the side lobe power. As more beams are used, additional side lobes spill signals into adjacent beams. As a result, the additional beams further reduce the signal-to-interference ratio of the system. As the beam patterns 600-604 are limited in terms of the difference between main lobe and side lobe power ratios, any degradation of the inherent power levels severely impacts performance of the system 100.

As shown in FIG. 6, when there are no coefficient or phase errors, the 13 dB difference in power between the main lobe and the side lobe power levels is discernible. Standard receivers are typically able to operate with such a signal-to-interference ratio.

Figure 7:
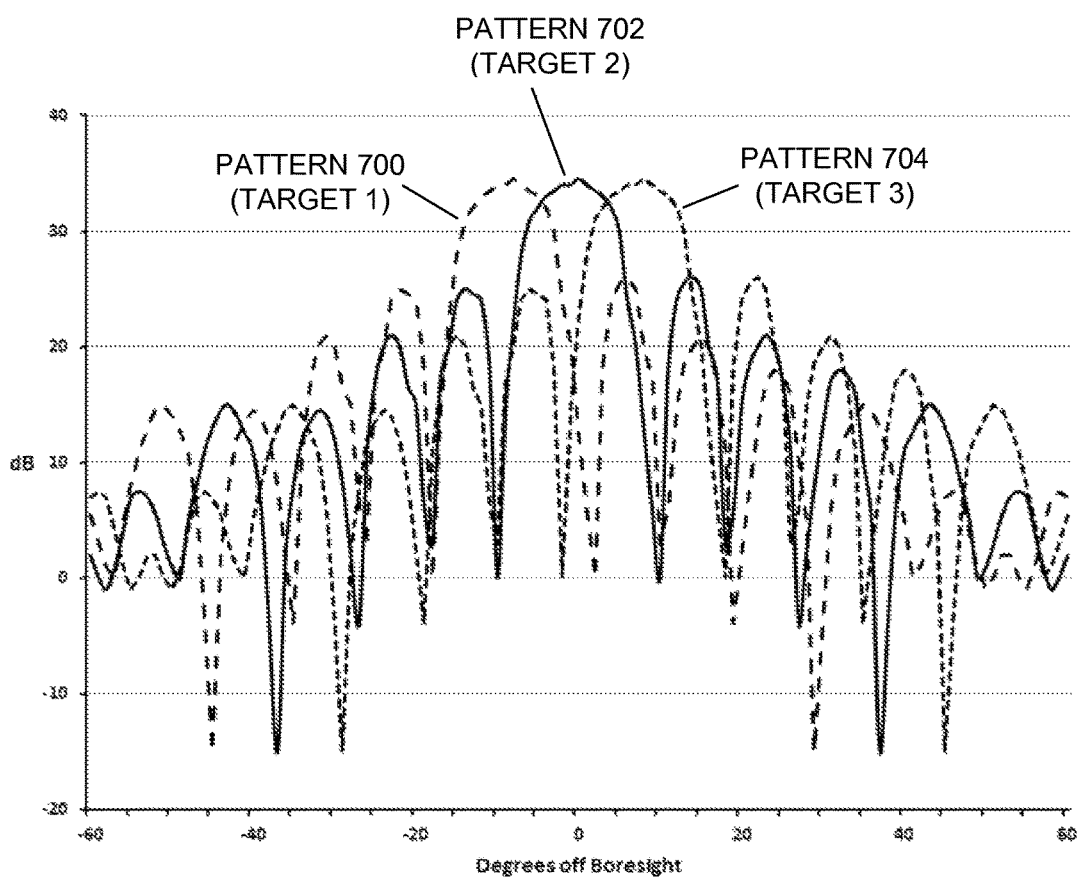
FIG. 7 illustrates an example beam configuration of FIG. 6 with coefficient and phase errors introduced.

FIG. 7 illustrates an example beam configuration of FIG. 6 with coefficient and phase errors introduced.

FIG. 7 illustrates the beam patterns 700-704, where random errors of plus and minus 10 degrees in phase and plus and minus 15 percent in amplitude are introduced into the coefficients used to form the antenna beams. The peak gain to interfering side lobes ratio is reduced from 13 dB to 8 dB, more than a doubling of adjacent beam interference. Such degradation introduces errors in data transfer, reduces data throughput, and increases the possibility of lost communications channels in the system 100.

Position/Attitude Information and Feedback

The aircraft 102 that are in communication with the BTS 104 and/or the BTS 106 via the communication link 110 and/or the communication link 112 (e.g., air to ground (ATG) communication links) are typically in well-known positions and move across the geographic regions serviced by the BTS 104 and/or the BTS 106. The aircraft receiver 216, either via the processor 211 or other measurement device at the aircraft 102, can measure the signal that is transmitted by the BTS antenna 114 and the BTS antenna 116 (e.g., the antenna 200), and send these measurements back to the BTS 104 and the BTS 106 via the communication link 110. Such measurements by the aircraft 102 allow for more precise feedback to the BTS 104 and the BTS 106 to correct the phase and amplitude coefficients used by the antenna controller 210 to drive the antenna elements 202-208 of the antenna 200 (e.g., the BTS antenna 114 and/or the BTS antenna 116). Such measurements can be made in conjunction with changes to the BTS 104/BTS 106 beam patterns, or can be made simultaneous with changes to the BTS 104/BTS 106 beam pattern, or can be made in any combination of concurrent or in conjunction with changes to the beam pattern.

Further, the aircraft 102 can send precise aircraft position and attitude information 224, which may include the time of the signal strength measurements and/or the time of the position/attitude measurements, via the communication link 110. The BTS 104 and the BTS 106 can then use the signal and the aircraft position and attitude information 224 from any one, any plurality, or all available aircraft to calculate the transmit beam patterns for the antenna 200 and make any amplitude and phase adjustments via the antenna controller 210 or other system for correcting the uplink beams.

The BTS 104 and/or the BTS 106 can also use the downlink signal of the communication link 110 (e.g., the transmission from the transmitter 213 and antenna 108) and the aircraft position and attitude information 224 to help calibrate the BTS 104 and the BTS 106 receiver antenna arrays. Though the base station transmit and receive antennas may be the same physical array of the antenna elements 202-208, the phase and amplitude parameters used to form the transmit beam may be different than the phase and amplitude parameters used to form the receive beam of the communication link 110. The BTS 104-106 can also make use of the aircraft position and attitude information 224 when measuring both the uplink and downlink signals of the communication link 110 to remove the effects of the antenna pattern when calibrating the BTS 104 and the BTS 106, the BTS antenna 114, and the BTS antenna 116. Such measurements can be made in conjunction with changes to the BTS 104 beam pattern, or can be made simultaneous with changes to the BTS 104 beam pattern, or can be made in any combination of concurrent or in conjunction with changes to the beam pattern.

Figure 8:
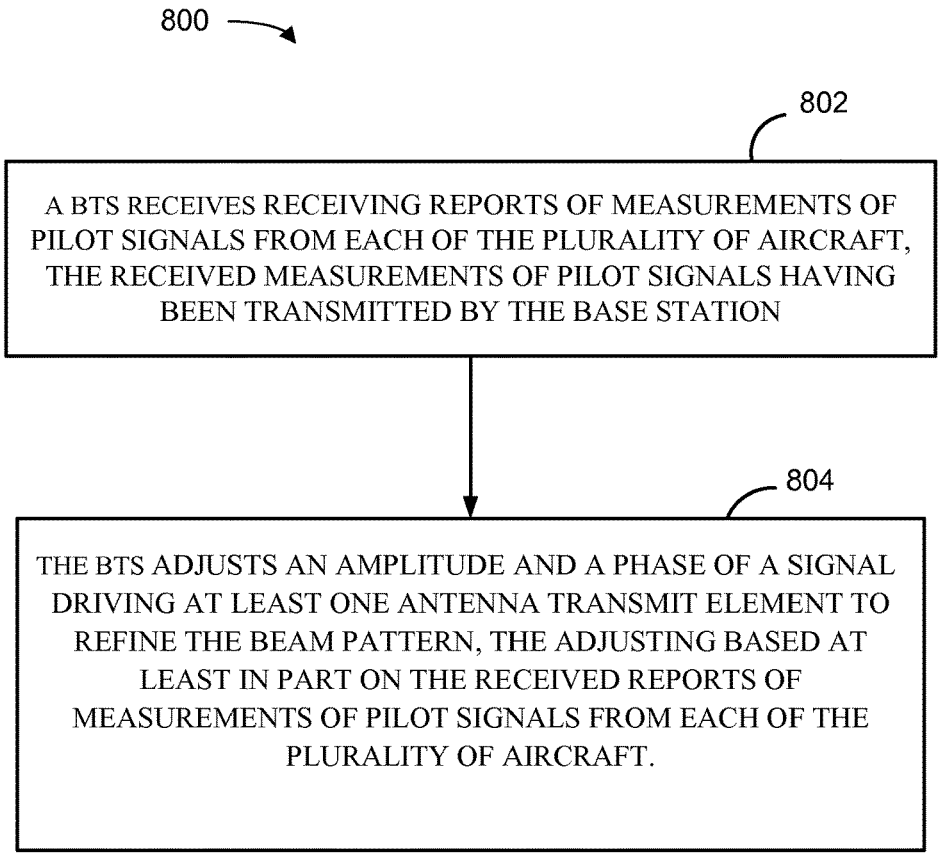
FIG. 8 illustrates a method of refining a beam pattern of a transmit beam of a base station antenna in accordance with one aspect of the disclosure.

FIG. 8 illustrates a method 800 of refining a beam pattern of a transmit beam of a base station antenna in accordance with one aspect of the disclosure. As shown in block 802, a BTS receives reports of measurements of pilot signals from each of the plurality of aircraft, the received measurements of pilot signals having been transmitted by the base station. As shown in block 804, the base transceiver station (BTS) adjusting an amplitude and a phase of a signal driving at least one antenna transmit element to refine the beam pattern, the adjusting based at least in part on the received reports of measurements of pilot signals from each of the plurality of aircraft.

Figure 9:
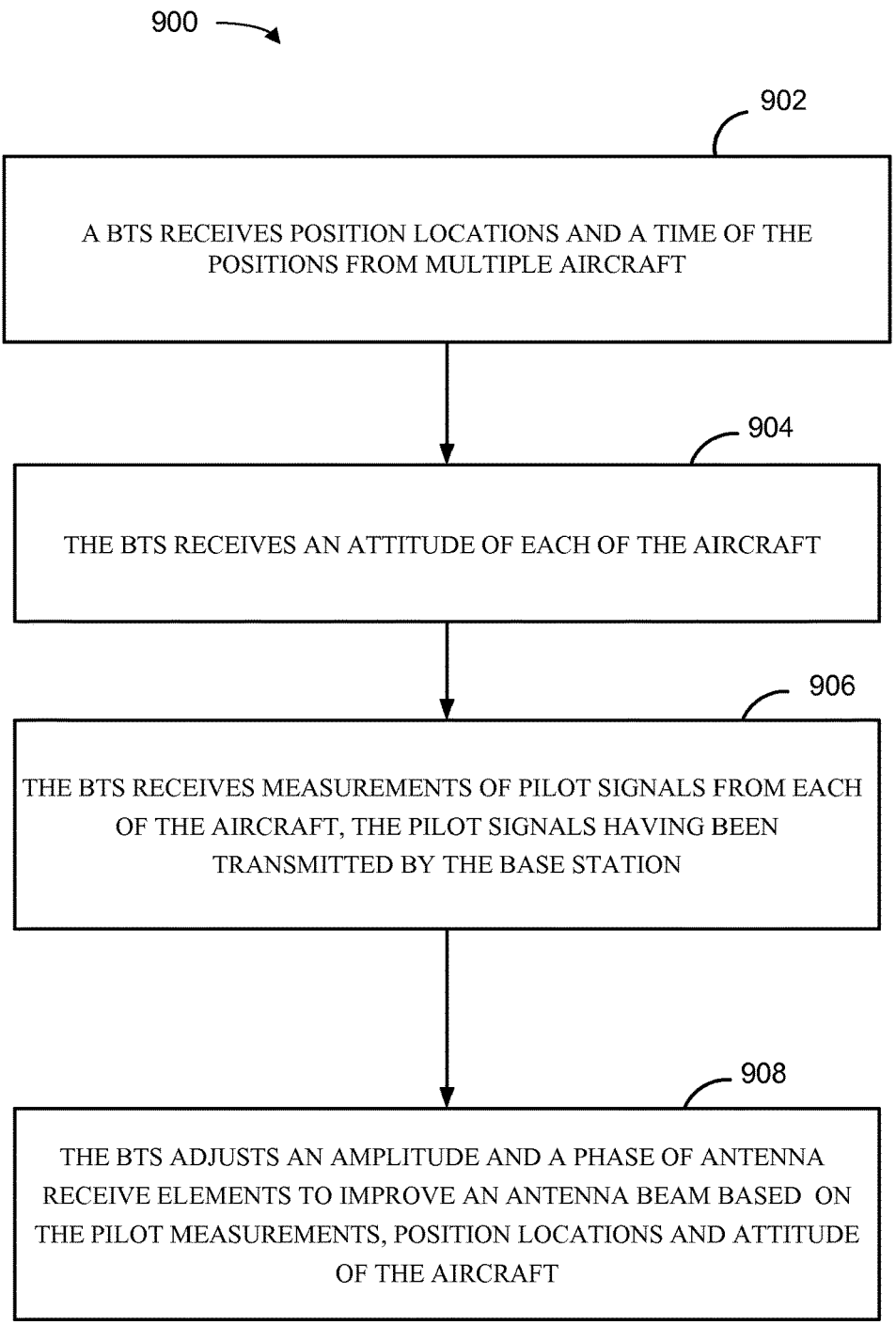
FIG. 9 illustrates a method of refining a beam pattern of a transmit beam of a base station antenna in accordance with another aspect of the disclosure.

FIG. 9 illustrates a method 900 of refining a beam pattern of an antenna beam of a base station antenna in accordance with another aspect of the disclosure. In block 902, a BTS receives position locations and a time of the positions from multiple aircraft. In block 904, the BTS receives an attitude of each of the aircraft. In block 906, the BTS receives measurements of the pilot signals from each of the aircraft, in which the pilot signals were transmitted by the base station. In block 908, the BTS adjusts an amplitude and a phase of a signal driving antenna receive elements to improve an antenna beam based at least in part on the pilot measurements, position locations and attitude of the aircraft.

Figure 10:
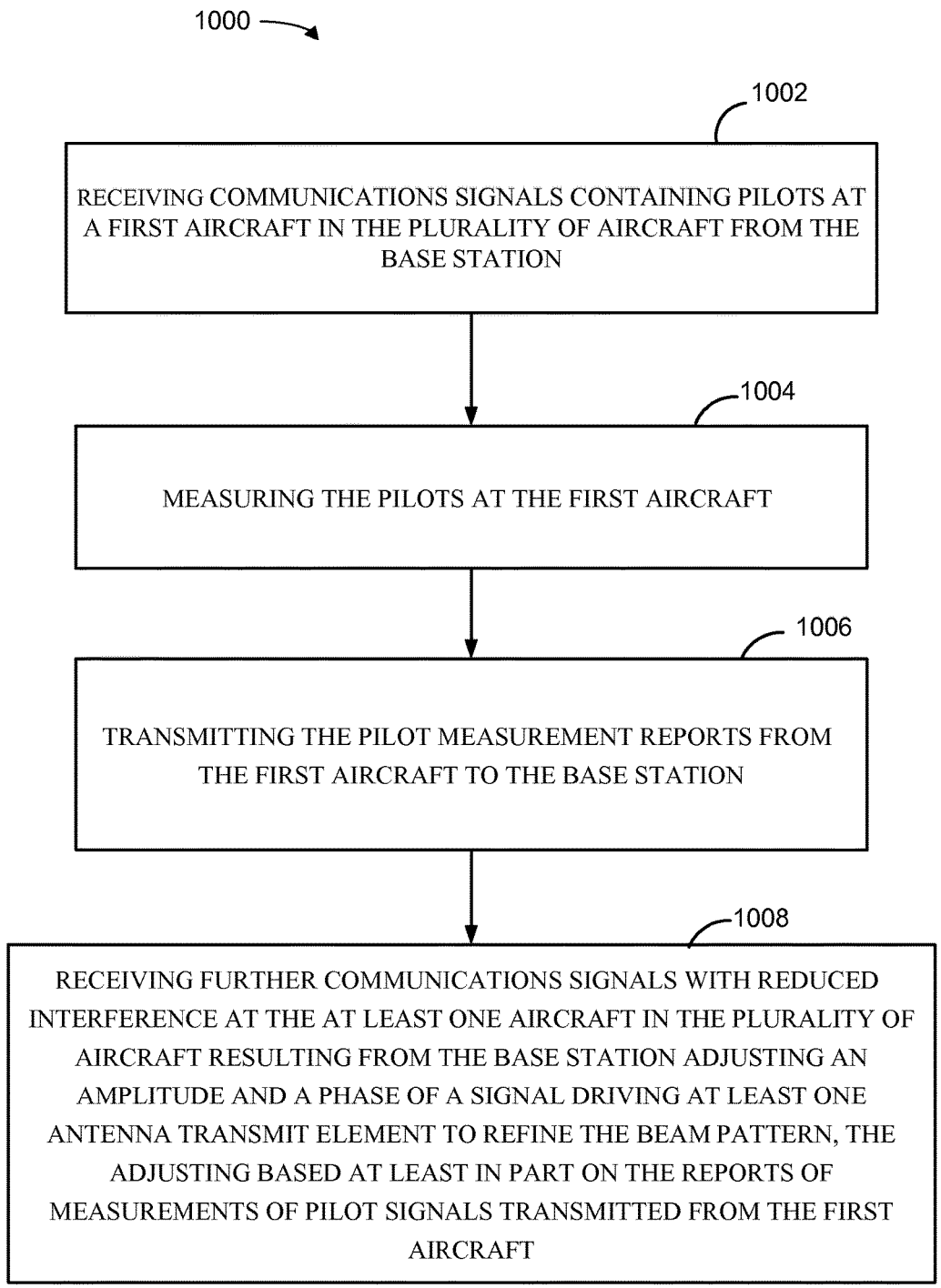
FIG. 10 illustrates a method of refining a beam pattern of a transmit beam of a base station antenna in accordance with another aspect of the disclosure.

FIG. 10 illustrates a method 1000 of refining a beam pattern of an antenna beam of a base station antenna in accordance with another aspect of the disclosure. Block 1002 illustrates receiving communication signals containing pilots at a first aircraft in the plurality of aircraft from the base station. Block 1004 illustrates measuring the pilots at the first aircraft. Block 1006 illustrates transmitting the pilot measurement reports from the first aircraft to the base station. Block 1008 illustrates receiving further communication signals with reduced interference at the at least one aircraft in the plurality of aircraft resulting from the base station adjusting an amplitude and a phase of a signal driving at least one antenna transmit element to refine the beam pattern, the adjusting based at least in part on the reports of measurements of pilot signals transmitted from the first aircraft.

Although described as the processor 212, the systems of the present disclosure may incorporate multiple processors, running in parallel or in series, and may be implemented with a bus architecture. The bus may include any number of interconnecting buses and bridges depending on the specific application of the processing system and the overall design constraints. The bus links together various circuits including one or more processors and/or hardware modules, represented by the processor 212.

The processor 212 may be coupled to or include computer-readable medium 250. The processor 212 is responsible for general processing, including the execution of software stored on the computer-readable medium 250. The software, when executed by the processor 212, causes various functions to be performed as described for any particular apparatus. The computer-readable medium 250 may also be used for storing data that is manipulated by the processor 212 when executing software.

Further, the processor 212, having been described in connection with various apparatuses and methods, may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

The computer-readable medium 250 may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, in which reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of refining a beam pattern of a base station antenna configured to communicate with a plurality of aircraft using a plurality of beams, in which interference to adjacent beams from a base station is reduced, comprising:
    receiving reports of measurements of pilot signals from each of the plurality of aircraft, the pilot signals having been transmitted by the base station through pencil beams and measured at each of the plurality of aircraft;
    adjusting a transmit amplitude and a transmit phase of a transmit signal driving at least one antenna transmit element to refine the beam pattern by reducing side lobes of the beam pattern to reduce interference with signals for other aircraft of the plurality of aircraft, the adjusting based at least in part on the received reports of measurements of pilot signals from each of the plurality of aircraft; and
    adjusting a receive amplitude and a receive phase of a receive signal driving at least one antenna receive element of the base station antenna, the receive amplitude and the receive phase having different parameters than the transmit amplitude and the transmit phase, the adjusting of the transmit amplitude and the transmit phase and the receive amplitude and the receive phase occurring after determining a shape of the beam pattern of the base station antenna at a determined distance from the base station antenna.

2. The method of claim 1, further comprising receiving at least one position location of each of the plurality of aircraft and further adjusting the transmit amplitude and the transmit phase of the transmit signal driving the at least one antenna transmit element based at least in part on the at least one position location of each of the plurality of aircraft.

3. The method of claim 2, further comprising forwarding at least one of the received position locations of at least one of the plurality of aircraft to another base station for handoff.

4. The method of claim 2, further comprising receiving a time of the received position locations of each of the plurality of aircraft and further adjusting the transmit amplitude and the transmit phase of the transmit signal driving at least one antenna transmit element based at least in part on the time of the received position locations of each of the plurality of aircraft.

5. The method of claim 1, further comprising receiving an attitude of each of the plurality of aircraft and further adjusting the transmit amplitude and the transmit phase of the transmit signal driving the at least one antenna transmit element based at least in part on the attitude of each of the plurality of aircraft.

6. The method of claim 5, further comprising forwarding the attitude of at least one of the plurality of aircraft to another base station for handoff.

7. The method of claim 1, further comprising adjusting the transmit amplitude and the transmit phase of the transmit signal driving at least one antenna transmit element based at least in part on atmospheric conditions.

8. A method of refining a beam pattern of an antenna beam of a base station antenna configured to communicate with a plurality of aircraft with a plurality of beams, to reduce interference to adjacent beams from a base station, comprising:
  receiving position locations from each of the plurality of aircraft;
  receiving an attitude of each of the plurality of aircraft;
  receiving measurements of pilot signals, the pilot signals transmitted by the base station antenna through pencil beams, the measurements occurring at each of the plurality of aircraft and transmitted from each of the plurality of aircraft;
  adjusting a receive amplitude and a receive phase of a receive signal driving at least one antenna receive element to refine the beam pattern by reducing side lobes of the beam pattern to reduce interference with signals for other aircraft of the plurality of aircraft, the adjusting based at least in part on the received measurements of pilot signals, the received position locations, and/or the attitude of each of the plurality of aircraft; and
  adjusting a transmit amplitude and a transmit phase of a transmit signal driving at least one antenna transmit element of the base station antenna, the receive amplitude and the receive phase having different parameters than the transmit amplitude and the transmit phase, the adjusting of the transmit amplitude and the transmit phase and the receive amplitude and the receive phase occurring after determining a shape of the beam pattern of the base station antenna at a determined distance from the base station antenna.

9. The method of claim 8, further comprising receiving a time of the received position locations of each of the plurality of aircraft and adjusting the receive amplitude and the receive phase of the receive signal driving at least one antenna receive element based at least in part on the time of the received position locations of each of the plurality of aircraft.

10. The method of claim 9, further comprising adjusting the receive amplitude and the receive phase of the receive signal driving at least one antenna receive element based at least in part on atmospheric conditions.

11. The method of claim 8, further comprising forwarding the received position locations and the attitude of at least one of the plurality of aircraft to another base station for handoff.

12. An apparatus for refining a beam pattern of a base station antenna configured to communicate with a plurality of aircraft with a plurality of beams, comprising:
  means for receiving position locations from each of the plurality of aircraft;
  means for receiving an attitude of each of the plurality of aircraft;
  means for receiving measurements of pilot signals from each of the plurality of aircraft, the pilot signals having been transmitted by a base station through pencil beams and measured at each of the plurality of aircraft;
  means for adjusting, after determining a shape of the beam pattern of the base station antenna at a determined distance from the base station antenna, a transmit amplitude and a transmit phase of a transmit signal driving at least one antenna transmit element to refine the beam pattern by reducing side lobes of the beam pattern to reduce interference with signals for other aircraft of the plurality of aircraft, the adjusting based at least in part on the measurements of the pilot signals, the received position locations, and/or the attitude of each of the plurality of aircraft; and
  means for adjusting, after determining the shape of the beam pattern of the base station antenna at the determined distance from the base station antenna, a receive amplitude and a receive phase of a receive signal driving at least one antenna receive element of the base station antenna, the receive amplitude and the receive phase having different parameters than the transmit amplitude and the transmit phase.

13. The apparatus of claim 12, further comprising means for receiving a time of the received position locations of each of the plurality of aircraft and means for adjusting the transmit amplitude and the transmit phase of the transmit signal driving at least one antenna transmit element based at least in part on the time of the received position locations of each of the plurality of aircraft.

14. The apparatus of claim 13, further comprising means for adjusting the transmit amplitude and the transmit phase of the transmit signal driving at least one antenna transmit element based at least in part on atmospheric conditions.

15. The apparatus of claim 13, further comprising means for forwarding the received position locations and the attitude of at least one of the plurality of aircraft to another base station for handoff.

16. An apparatus for refining a beam pattern of a base station antenna configured to communicate with a plurality of aircraft with a plurality of beams, comprising:
  a transmitter configured to transmit pilot signals through pencil beams to each of the plurality of aircraft;
  a receiver configured to receive position locations from each of the plurality of aircraft, and an attitude of each of the plurality of aircraft and measurements of the pilot signals measured at each of the plurality of aircraft;
  a controller, coupled through a processor to the transmitter and the receiver, configured to adjust, after a shape of the beam pattern of the base station antenna at a determined distance from the base station antenna is determined, a transmit amplitude and a transmit phase of a transmit signal driving at least one antenna transmit element to refine the beam pattern by reducing side lobes of the beam pattern to reduce interference with signals for other aircraft of the plurality of aircraft, the adjusting based at least in part on the measurements of the pilot signals, the position locations, and/or the attitude of each of the plurality of aircraft; and the controller further being configured to adjust, after the shape of the beam pattern of the base station antenna at the determined distance from the base station antenna is determined, the receive amplitude and the receive phase of the receive signal driving at least one antenna receive element of the base station antenna, the receive amplitude and the receive phase having different parameters than the transmit amplitude and the transmit phase.

17. The apparatus of claim 16, in which the receiver is further configured to receive a time of the position locations of each of the plurality of aircraft, and the controller is configured to adjust the transmit amplitude and the transmit phase of the transmit signal driving at least one antenna transmit element based at least in part on the time of the position locations of each of the plurality of aircraft.

18. The apparatus of claim 17, in which the controller is further configured to adjust the transmit amplitude and the transmit phase of the transmit signal driving at least one antenna transmit element based at least in part on atmospheric conditions.

19. The apparatus of claim 16, in which the transmitter is configured to forward the position locations and the attitude of at least one of the plurality of aircraft to another base station for handoff.

20. A non-transitory computer-readable medium having program code recorded thereon, the program code being executed by a processor at a base station for refining a beam pattern of a base station antenna, and comprising:

program code to transmit pilot signals through pencil beams to a plurality of aircraft;

program code to receive position locations from each of the plurality of aircraft, and an attitude of each of the plurality of aircraft and measurements of the pilot signals measured at each of the plurality of aircraft;

program code to adjust, after determining a shape of the beam pattern of the base station antenna at a determined distance from the base station antenna, a transmit amplitude and a transmit phase of a transmit signal driving at least one antenna transmit element to refine the beam pattern by reducing side lobes of the beam pattern to reduce interference with signals for other aircraft of the plurality of aircraft, the adjustment based at least in part on the measurements of the pilot signals, the position locations, and/or the attitude of each of the plurality of aircraft; and program code to adjust, after determining the shape of the beam pattern of the base station antenna at the determined distance from the base station antenna, a receive amplitude and a receive phase of a receive signal driving at least one antenna receive element of the base station antenna, the receive amplitude and the receive phase having different parameters than the transmit amplitude and the transmit phase.

21. A method of aiding in refinement of a beam pattern of a base station antenna configured to communicate between a base station and a plurality of aircraft using a plurality of beams, comprising:

receiving communication signals containing pilot signals from the base station, the pilot signals transmitted by the base station through pencil beams;

measuring the pilot signals at the plurality of aircraft;

transmitting pilot measurement reports to the base station; and receiving further communication signals with reduced interference resulting from the base station adjusting a transmit amplitude and a transmit phase of a transmit signal driving at least one antenna transmit element to refine the beam pattern by reducing side lobes of the beam pattern to reduce interference with signals for other aircraft of the plurality of aircraft, the adjusting based at least in part on the transmitted pilot measurement reports from each of the plurality of aircraft, the transmit amplitude and the transmit phase having different parameters than a receive amplitude and a receive phase of the base station, the adjusting of the transmit amplitude and the transmit phase occurring after determining a shape of the beam pattern of the base station antenna at a determined distance from the base station antenna.

22. The method of claim 21, further comprising transmitting a position location and receiving further communication signals with reduced interference resulting from the base station adjusting the transmit amplitude and the transmit phase of the transmit signal driving at least one antenna transmit element to refine the beam pattern, the adjusting based at least in part on the transmitted position location.

23. The method of claim 21, further comprising transmitting an attitude and receiving further communication signals with reduced interference resulting from the base station adjusting the transmit amplitude and the transmit phase of the transmit signal driving at least one antenna transmit element to refine the beam pattern, the adjusting based at least in part on the transmitted attitude.

24. A system for refining a beam pattern of a base station antenna configured to communicate between a base station and a plurality of aircraft using a plurality of beams, comprising:

an aircraft receiver configured to receive communication signals containing pilot signals from a base station transmitter, the pilot signals transmitted by the base station transmitter through pencil beams;

a processor, coupled to the receiver, configured to measure the pilot signals at a first aircraft of the plurality of aircraft;

an aircraft transmitter of the first aircraft of the plurality of aircraft, coupled to the processor, configured to transmit pilot signal measurement reports to the base station;

a controller, coupled to the base station transmitter, configured to adjust, after a shape of the beam pattern of the base station antenna at a determined distance from the base station antenna is determined, a transmit amplitude and a transmit phase of a transmit signal driving at least one antenna transmit element in the base station transmitter to refine the beam pattern by reducing side lobes of the beam pattern to reduce interference with signals for other aircraft of the plurality of aircraft, the adjusting based at least in part on the transmitted pilot signal measurement reports; and the controller, further coupled to a base station receiver, configured to, after the shape of the beam pattern of the base station antenna at the determined distance from the base station antenna is determined, adjust a receive amplitude and a receive phase of a receive signal driving at least one antenna receive element in the base station receiver, the receive amplitude and the receive phase having different parameters than the transmit amplitude and the transmit phase.

25. The system of claim 24, in which the aircraft transmitter is further configured to transmit a position location, and the controller is further configured to adjust the transmit amplitude and the transmit phase of the transmit signal driving at least one antenna transmit element to transmit further communication signals with reduced interference based at least in part on the position location transmitted from the first aircraft.

26. The system of claim 24, in which the aircraft transmitter is further configured to transmit an attitude of the first aircraft and the controller is further configured to adjust the transmit amplitude and the transmit phase of the transmit signal driving at least one antenna transmit element to transmit further communication signals with reduced interference, the adjusting based at least in part on the transmitted attitude.

27. A system for refining a beam pattern of a base station antenna configured to communicate between a base station and a plurality of aircraft using a plurality of beams, comprising:
   means for receiving communication signals containing pilot signals from a base station transmitter, the pilot signals transmitted by the base station transmitter through pencil beams;
   means, coupled to the receiving means, for measuring the pilot signals at a first aircraft of the plurality of aircraft;
   means, coupled to processing means, for transmitting pilot signal measurement reports to the base station;
   means, coupled to the base station transmitter, for adjusting, after determining a shape of the beam pattern of the base station antenna at a determined distance from the base station antenna, a transmit amplitude and a transmit phase of a transmit signal driving at least one antenna transmit element in the base station transmitter to refine the beam pattern by reducing side lobes of the beam pattern to reduce interference with signals for other aircraft of the plurality of aircraft, the adjusting based at least in part on the transmitted pilot signal measurement reports from each of the plurality of aircraft; and
   means, coupled to a base station receiver, for adjusting, after determining the shape of the beam pattern of the base station antenna at the determined distance from the base station antenna, a receive amplitude and a receive phase of a receive signal driving at least one antenna receive element in the base station receiver, the receive amplitude and the receive phase having different parameters than the transmit amplitude and the transmit phase.

28. The system of claim 27, in which the means for transmitting further transmits a position location, and the means for adjusting adjusts the transmit amplitude and the transmit phase of the transmit signal driving at least one antenna transmit element to transmit further communication signals with reduced interference based at least in part on the transmitted position location.

29. The system of claim 27, in which the means for transmitting further transmits an attitude of the first aircraft and the means for adjusting adjusts the transmit amplitude and the transmit phase of the signal driving at least one antenna transmit element to transmit further communication signals with reduced interference, the adjusting based at least in part on the transmitted attitude.

30. A non-transitory computer-readable medium having program code recorded thereon, the program code executed by a processor at a base station for refining a beam pattern of a base station antenna, and comprising:
   program code to receive communication signals containing pilot signals at the base station, the pilot signals transmitted to the base station through pencil beams,
   program code to measure the pilot signals of a first aircraft of a plurality of aircraft;
   program code to receive pilot signal measurement reports at the base station;
   program code to adjust, after determining a shape of the beam pattern of the base station antenna at a determined distance from the base station antenna, a transmit amplitude and a transmit phase of a transmit signal driving at least one antenna transmit element to refine the beam pattern by reducing side lobes of the beam pattern to reduce interference with signals for other aircraft of the plurality of aircraft, the adjusting based at least in part on the transmitted pilot signal measurement reports from each of the plurality of aircraft; and
   program code to adjust, after determining the shape of the beam pattern of the base station antenna at the determined distance from the base station antenna, a receive amplitude and a receive phase of a receive signal driving at least one antenna receive element, the receive amplitude and the receive phase having different parameters than the transmit amplitude and the transmit phase.

* * * * *